US008612414B2

(12) United States Patent
Lee et al.

(10) Patent No.: US 8,612,414 B2
(45) Date of Patent: Dec. 17, 2013

(54) GROUPED SEARCH QUERY REFINEMENTS (75) Inventors: Michelle I. Lee, Brooklyn, NY (US); Keekim J. Heng, Zurich (CH); Jens Riegelsberger, London (GB); Jocelyn Lin, Mountain View, CA (US)

(73) Assignee: Google Inc., Mountain View, CA (US)

( * ) Notice: Subject to any disclaimer, the term of this patent is extended or adjusted under 35 U.S.C. 154(b) by 5 days.

(21) Appl. No.: 13/300,759

(22) Filed: Nov. 21, 2011

(65) Prior Publication Data
US 2013/0132359 A1 May 23, 2013

(51) Int. Cl.
*G06F 17/30* (2006.01)

(52) U.S. Cl.
USPC .......................................... 707/706; 707/724

(58) Field of Classification Search
USPC .................................. 707/706, 724
See application file for complete search history.

(56) References Cited

U.S. PATENT DOCUMENTS

| | | | |
|---|---|---|---|
| 5,930,474 A | | 7/1999 | Dunworth et al. |
| 6,564,213 B1 | * | 5/2003 | Ortega et al. ........................ 1/1 |
| 7,539,693 B2 | * | 5/2009 | Frank et al. ........................ 1/1 |
| 7,617,205 B2 | | 11/2009 | Bailey et al. |
| 7,725,485 B1 | | 5/2010 | Sahami et al. |
| 7,797,642 B1 | * | 9/2010 | Karam et al. ................. 715/810 |
| 7,836,044 B2 | | 11/2010 | Kamvar et al. |
| 7,844,599 B2 | * | 11/2010 | Kasperski et al. ............ 707/713 |
| 7,870,147 B2 | | 1/2011 | Bailey et al. |
| 7,917,866 B1 | * | 3/2011 | Karam .......................... 715/810 |
| 8,027,990 B1 | | 9/2011 | Mysen et al. |
| 2005/0182770 A1 | * | 8/2005 | Rasmussen et al. ............. 707/10 |
| 2006/0218114 A1 | * | 9/2006 | Weare et al. ....................... 707/1 |
| 2006/0248078 A1 | * | 11/2006 | Gross et al. ........................ 707/5 |
| 2007/0016651 A1 | * | 1/2007 | Blagsvedt et al. ............. 709/217 |
| 2008/0109401 A1 | * | 5/2008 | Sareen et al. ...................... 707/3 |
| 2008/0228754 A1 | * | 9/2008 | Frank et al. ........................ 707/5 |
| 2008/0256039 A1 | | 10/2008 | Chang et al. |
| 2009/0043741 A1 | | 2/2009 | Kim |

(Continued)

FOREIGN PATENT DOCUMENTS

WO  WO2011014978 A1  2/2011
WO  WO2011014979 A1  2/2011

OTHER PUBLICATIONS

Notification of Transmittal of the International Search Report and the Written Opinion of the International Searching Authority for PCT/US2012/064763 dated Mar. 8, 2013, 12 pages.

(Continued)

*Primary Examiner* — Thanh-Ha Dang
(74) *Attorney, Agent, or Firm* — Fish & Richardson P.C.

(57) ABSTRACT

Methods, systems, and apparatus, including computer programs encoded on one or more computer storage devices, for grouping search query refinements. One of the methods includes while receiving a text input into an input field by a user and before the user has submitted the text input to a search engine obtaining query suggestions based at least in part on the text input. The method includes grouping query suggestions based on a common query term shared by the query suggestions, wherein the query suggestions include terms that refine the common query term. The method includes transmitting a set of query suggestions to a client device for presentation, wherein the set includes the query suggestions that are presented as a group with the common query term presented in a prominent position and the refinement terms presented in subordinate positions and wherein the common query term and the refinement terms are each user-selectable.

21 Claims, 5 Drawing Sheets

(56) References Cited

U.S. PATENT DOCUMENTS

| | | | |
|---|---|---|---|
| 2009/0055087 A1* | 2/2009 | Beacher | 701/200 |
| 2009/0119289 A1* | 5/2009 | Gibbs et al. | 707/5 |
| 2009/0144234 A1* | 6/2009 | Sharif et al. | 707/3 |
| 2010/0082604 A1* | 4/2010 | Gutt et al. | 707/721 |
| 2010/0114929 A1* | 5/2010 | Bonchi et al. | 707/759 |
| 2010/0146394 A1* | 6/2010 | Morris | 715/733 |
| 2010/0333200 A1 | 12/2010 | Chen et al. | |
| 2011/0041084 A1* | 2/2011 | Karam | 715/753 |
| 2011/0055189 A1 | 3/2011 | Effrat et al. | |
| 2011/0173066 A1* | 7/2011 | Simmons | 705/14.49 |
| 2011/0173142 A1 | 7/2011 | Dasgupta et al. | |
| 2011/0173572 A1* | 7/2011 | van Zwol et al. | 715/856 |
| 2011/0218948 A1 | 9/2011 | De et al. | |
| 2011/0238608 A1* | 9/2011 | Sathish | 706/47 |
| 2012/0082371 A1 | 4/2012 | Bengio et al. | |
| 2012/0150657 A1* | 6/2012 | Rubinstein et al. | 705/14.66 |
| 2012/0265763 A1* | 10/2012 | Meretab | 707/741 |
| 2013/0036137 A1* | 2/2013 | Ollis et al. | 707/771 |
| 2013/0041878 A1* | 2/2013 | Satyanarayana et al. | 707/706 |

OTHER PUBLICATIONS

Anonymous: "Apple.com style search suggestion using jQuery", Mar. 12, 2010, 1 page. Retrieved from the Internet: URL:http://web.archive.org/web/20100312123408/http://ajaxdump.com/2010/03/06/apple-com-style-search-suggestion-using-jquery/. [retrieved on Feb. 15, 2013] screenshot, p. 1.

Meschkat et al.: "The Google Maps search box just got smarter" Apr. 22, 2010, 11 page XP055053571. Retrieved from the Internet: URL:http://google-latlong.blogspot.nl/2010/04/google-maps-search-box-just-got-smarter.html. [retrieved on Feb. 15, 2013], p. 1.

Sullivan, D. "How Google Instant's Autocomplete Suggestions Work", Apr. 8, 2011, pp. 1-8, XP055053567. Retrieved from the Internet: URL:http://web.archive.org/web/20110408021545/http://searchengineland.com/how-google-instant-autocomplete-suggestions-work-62592. [retrieved on Feb. 15, 2013], pp. 1-8.

Kohn AJ: "Google Related Searches", Jun. 16, 2011, pp. 1-5 XP055053669. Retrieved from the Internet: URL: http://web.archive.org/web/20110616161015/http://www.blindfiveyearold.com/google-related-searches [retrieved on Feb. 18, 2013], pp. 1-4.

\* cited by examiner

GROUPED SEARCH QUERY REFINEMENTS

TECHNICAL FIELD

This specification relates to presenting search query suggestions.

BACKGROUND

Users of electronic devices that are searching a body of information often input a search query into a field of search engine, e.g., by typing or voice input. A user typically inputs a query using a set of keywords that the user believes are likely to produce the desired information. However, in some instances, a user does not choose the best keywords for their search. In other instances, the user is using a device, e.g., a hand-held mobile device such as a smartphone, to input a query and the less characters the user needs to input, the more desirable for the user, on account of a small-sized input device (e.g., a soft keyboard displayed on the touchscreen of a smart phone). In other instances, even when the user is inputting the query using a full-sized input device, the user may prefer to enter as few characters as possible. Queries can be suggested to a user as they are inputting the characters forming their search query, which provides the user an opportunity to select a suggested query and cease inputting their own query.

Interactive geographic maps can be viewed in web browsers and other software. A user can view an interactive geographic map that displays a location, which can include information pertaining to surrounding businesses, business addresses, contact information, driving directions and otherwise that relate to the location displayed on the map. Some interactive maps allow users to manipulate the maps to view adjacent sections, zoom in or out, and/or to view satellite images of the location. Interactive mapping systems may provide query suggestions in response to received queries (or partially received queries).

SUMMARY

In general, one innovative aspect of the subject matter described in this specification can be embodied in methods that include the actions of while receiving a text input into a search engine query input field by a user and before the user has submitted the text input as a search query to a search engine obtaining a plurality of query suggestions based at least in part on the received text input. The methods include the actions of grouping at least some of the query suggestions based on a common primary query term shared by the query suggestions, wherein the grouped query suggestions include one or more refinement terms that refine the common primary query term. The methods also include the actions of transmitting a set of the plurality of query suggestions to a client device for presentation to the user, wherein the set includes the grouped query suggestions that are presented as a group with the common primary query term presented in a prominent position and the one or more refinement terms presented in subordinate positions relative to the common primary query term and wherein the common primary query term and the one or more refinement terms are each user-selectable.

Other embodiments of this aspect include corresponding systems, apparatus, and computer programs, configured to perform the actions of the methods, encoded on computer storage devices.

These and other embodiments can each optionally include one or more of the following features. The received text input may not include a complete word and the common primary query term comprises a suggested word completion of the received text input. The search engine query input field may be associated with a viewport displaying a portion of a graphical representation of a map at a zoom level. The one or more refinement terms that refine the common primary query term may be selected based, at least in part, on the zoom level of the map as presented in the viewport while the text input is being received. The zoom level may be zoomed out to display a geographical region that includes a plurality of cities and the one or more refinement terms may be selected, at least in part, to geographically refine the common primary query term. The zoom level may be zoomed in to display a geographical region that includes a geographical region approximately centered about a particular city and the one or more refinement terms may be selected, at least in part, to geographically and qualitatively refine the common primary query term. The zoom level may be zoomed in to display a geographical region that is approximately centered about a particular location within a city and the one or more refinement terms may be selected, at least in part, to qualitatively refine the common primary query term. Methods may also include the actions of receiving an input from the user selecting one of the query suggestions, wherein the received text input and the selected query suggestion comprise a search query. Methods may also include the actions of before the user has submitted the search query obtaining a second plurality of query suggestions based on the search query, wherein at least some of the query suggestions comprise refinement terms that refine the search query and are grouped together, transmitting a set of the second plurality of query suggestions to the client device for presentation to the user, wherein the set includes the grouped query suggestions that are presented in a position relative to the search query that indicates the grouped query suggestions are refinement terms that refine the search query. Methods may also include the actions of receiving an input from the user that selects the common primary query term and that submits a search query comprising the common primary query term to the search engine, obtaining a set of search results that are responsive to the search query, and transmitting the set of search results to the client device for presentation to the user, wherein the at least some of the refinement terms included in the grouped query suggestions are simultaneously presented to the user as user-selectable refinement terms that are selectable to refine the submitted search query.

Particular embodiments of the subject matter described in this specification can be implemented so as to realize one or more of the following advantages. Time to achieve search tasks can be reduced by assisting the users in query formulation. Enable users to refine queries by sub-category and location. Improve the search experience of the user by educating users about sub-categories and location refinement possibilities.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

While a user is inputting a query into a query input field, e.g., by typing or speaking, query suggestions may be presented to the user. The user can choose to select and submit one of the selected queries to a search engine, rather than finish inputting their query. Methods and systems are described that present a collection of query suggestions to a user in grouped fashion, such that query terms that modify a primary query term that is common to more than one query suggestions are grouped together. These grouped together query terms further refine the common primary query term. Organizing and presenting query suggestions to a user in this fashion can facilitate the user's experience in selecting a particular query suggestion.

In some implementations, while receiving a text input into a search engine query input field by a user, and before the user has submitted the text input as a search query to a search engine, multiple query suggestions are obtained based on the received text input. At least some of the query suggestions are grouped based on a common primary query term shared by the query suggestions. The grouped query suggestions each also include one or more refinement terms that refine the common primary query term. The multiple query suggestions are transmitted to a client device for presentation to the user. The grouped query suggestions are presented as a group, with the common primary query term presented in a prominent position and one or more refinement terms for the grouped query suggestions presented in subordinate positions relative to the common primary query term. The common primary query term (i.e., the broader query) and the one or more refinement terms (i.e., the narrower or refined queries) of the grouped query suggestions are each user-selectable.

Figure 1:
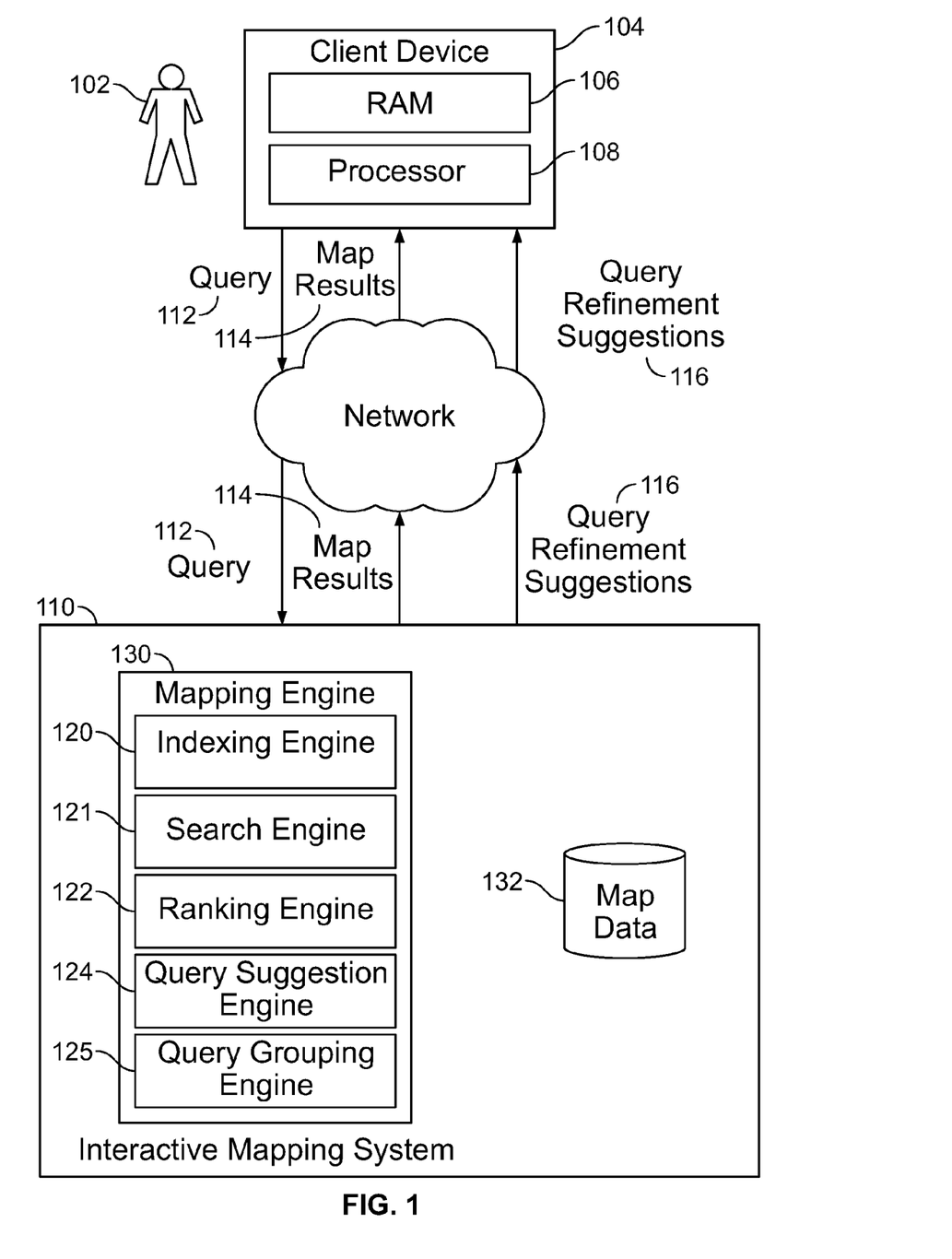
FIG. 1 is a schematic representation of an example system for presenting query refinement suggestions.

FIG. 1 is a schematic representation of an example system for presenting query refinement suggestions. The example system is an interactive mapping system 110 that interacts with one or more client devices, e.g., the client device 104. The interactive mapping system 110 can provide map data relevant to submitted queries and can be implemented in an internet, an intranet, or another client and server environment. The interactive mapping system 110 is an example of an information retrieval system in which the systems, components, and techniques described below can be implemented. However, it should be understood, that the techniques for presenting query refinement suggestions can be implemented in other types of systems that are not interactive mapping systems, or that are differently configured interactive mapping systems, and the system shown is but one illustrative example.

A user 102 can interact with the interactive mapping system 110 through the client device 104. For example, the client device 104 can be a computer coupled to the interactive mapping system through a local area network (LAN) or wide area network (WAN), e.g., the Internet. The client device 104 will generally include a random access memory (RAM) 106 and a processor 108.

The user 102 can submit a query 112 to a mapping engine 130 within the interactive mapping system 110. When the user 102 submits the query 112, the query 112 is transmitted through a network to the interactive mapping system 110. The interactive mapping system 110 can be implemented as, for example, computer programs running on one or more computers in one or more locations that are coupled to each other through a network. The interactive mapping system 110 includes a mapping engine 130. The interactive mapping system 110 responds to the query 112 by generating map results 114, which are transmitted through the network to the client device 104 in a form that can be presented to the user 102 (e.g., as an interactive mapping system web page to be displayed in a web browser running on the client device 104).

The interactive mapping system 110 also provides query refinement suggestions 116, which are also transmitted through the network to the client device 104. Query refinement suggestions 116 can include expanded query suggestions, that contain terms that were not indicated by the original query input by the user 102 and that refine a primary query term. Query refinement suggestions 116 can be transmitted to the client device 104 in response to receiving input from the client device 104 in a query input field and before the client device 104 has submitted a search query. Either way, the one or more groups of query refinement suggestions are transmitted to the client device 104 for presentation to the user 102 in a grouped fashion, so as to indicate that for a common primary query term there are multiple refinement terms suggested.

In the example interactive mapping system 110, a user 102 can be presented with a graphical representation of a portion of a map that displays one or more locations. The particular portion of the map that is displayed to the user 102 can be determined based on user input navigating the graphical representation of the map, e.g., dragging portions of the map into display in a viewport presented by the mapping system 110, or otherwise. A query input field is presented to the user, which can be included within the viewport, or presented next to the viewport on a display screen of the client device 104. The user 102 can input queries into the query input field in order to receive in response a set of map results. When the query 112 is received by the interactive mapping system 110, the search engine 121 included in the mapping engine 130 identifies map results 114 that are responsive to the query 112. Map results can be retrieved from a corpus of map data 132. The map data 132 can be stored in various data structures, such as directed graphs and tries. An indexing engine 130 can index the potentially multiple names of entities contained in the corpus of map data 132. The ranking engine 122 can rank search results (i.e., the map results) that are found responsive to the query by the search engine 121 for presentation to the user 102.

Figure 2A:
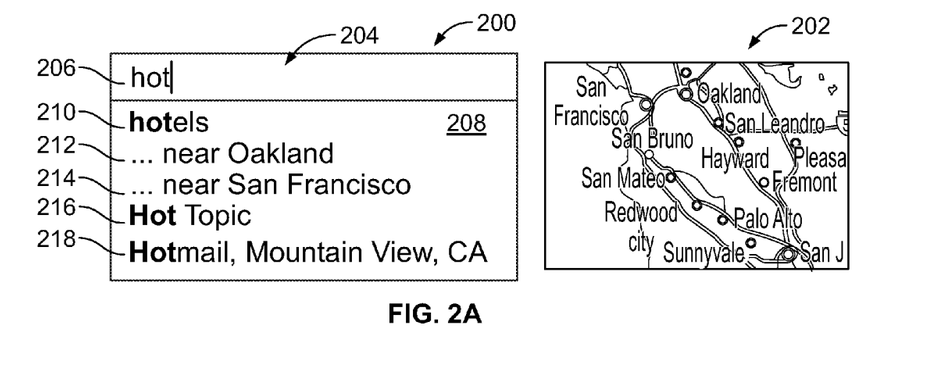
FIGS. 2A-2C and 3A each show a schematic representation of a viewport in an example mapping application and an associated query input field and presentation of query refinement suggestions.

The map data can include information pertaining to locations that are included in the map displayed to the user 102, for example, information about businesses, business addresses, contact information and driving directions. FIG. 2A shows a schematic representation of a viewport 202 in an example mapping application and an associated query input field 204 and presentation of query refinement suggestions 208. By way of illustrative example, the user 102 may be viewing the portion of map shown in the viewport 202, i.e., a map that shows a region of northern California that includes the cities of San Francisco and Oakland and various others. While this portion of the map is displayed in the viewport 202, the user begins to input a search query into the query input field 204. At a given time, as shown, the user has input three characters, being the characters "hot" 206. While the user's text input into the query input field 204 is being received and before the user has submitted the text input as a search query (e.g., before the user selects the "enter" key or otherwise inputs a command to submit the search query to initiate the search), query suggestions are obtained and presented to the user. In the implementation shown, the query suggestions are presented in a drop-down menu 208 that is adjacent to the query input field 204. However, if should be understood that in other implementations the query suggestions can be presented differently than as shown in FIG. 2A.

The query suggestions can be obtained using the query suggestion engine 124. The query suggestion engine 124 can be configured to generate multiple query suggestions using, for example, conventional techniques. The query suggestions can be based on characters that have already been input into the query input field by the user 102 and/or related to the portion of the map displayed simultaneously in the viewport (i.e., in the case of a mapping application). Various techniques can be used to generate query suggestions.

By way of illustrative, and non-limiting example, techniques as described in U.S. Pat. No. 7,725,485, "Generating Query Suggestions Using Contextual Information", issued on May 25, 2010, the entire contents of which are incorporated herein by reference, can be used. A database (e.g., a database that describes web pages or map results) can be searched for content that matches a query that has been input (or partially input) by a user, and a set of candidates responsive to the content matching the query can be generated and then filtered to produce a set of query suggestions. A query vector that is responsive to the content that matches the query can be generated, e.g., by generating a set of term vectors describing the content matching the query and generating the query vector from the set of term vectors.

The query suggestions that are received from the query suggestion engine 124 are grouped by query suggestions that include common primary query terms. That is, the query suggestions are analyzed and those query suggestions that begin with the same search term therefore have a "common primary query term" and are put together in a grouping of query suggestions. Search terms that are included in a query suggestion in addition to the common primary query term are the refinement terms. For example, referring again to FIG. 2A, the query suggestions provided by the query suggestion engine 124 included at least the following: (1) hotels; (2) hotels near Oakland; (3) hotels near San Francisco; (4) Hot Topic; and (5) Hotmail, Mountain View, Calif. The first three query suggestions are identified as having a common primary query term, i.e., the term "hotels". The additional terms included in the second and third query suggestions, i.e., for query suggestion (2) the terms "near Oakland" and for query suggestion (3) the terms "near San Francisco, are the refinement terms. These three query suggestions are grouped together and presented as a group.

The presentation of the group includes the common primary query term in a prominent position, i.e., the term "hotels" 210 in FIG. 2A. The refinement terms for each of the two query suggestions in the group that have refinement terms are placed in subordinate positions relative to the common primary query term, i.e., the refinement terms "near Oakland" 212 and "near San Francisco" 214. In the implementation shown, an ellipsis can be placed in front of the refinement terms to provide a further indication to the user that these are refinement terms to the common primary query term "hotels" 210. Other techniques can be used to present the grouping such that a user is given an indication that the query suggestions form a group that includes refinement terms. In this example, the user can choose to select the common primary query term itself as a query suggestion, i.e., select "hotels" 210. Alternatively, the user can select " . . . near Oakland" 212, which will result in the entire query suggestion of "hotels near Oakland" being submitted to the search engine 121. The other query suggestions that are not included in the group are also presented to the user and can be selected by the user, i.e., "Hot Topic" 216 and "Hotmail, Mountain View, Calif." 218.

In some implementations, the number of refinement terms presented to a user is dependent on a determined likelihood that the primary query term is an appropriate query completion for the characters entered into the query input field 204. For example, "hot" may correspond to the primary query term "hotels" and the primary query term "Hotmail." Therefore the primary query "hotels" has two corresponding query suggestions. If, for example, the characters entered into the query input field were less certain, for example, if the user had only entered the characters "ho" into the field, then there may be only a single corresponding query suggestion presented. As more characters are supplied, the likelihood that "hotels" is the appropriate primary query term increases and the number of corresponding suggestions may increase. In some implementations, the number of corresponding suggestions presented to the user is proportional to the number of characters entered into the query input field 204.

Figure 2B:
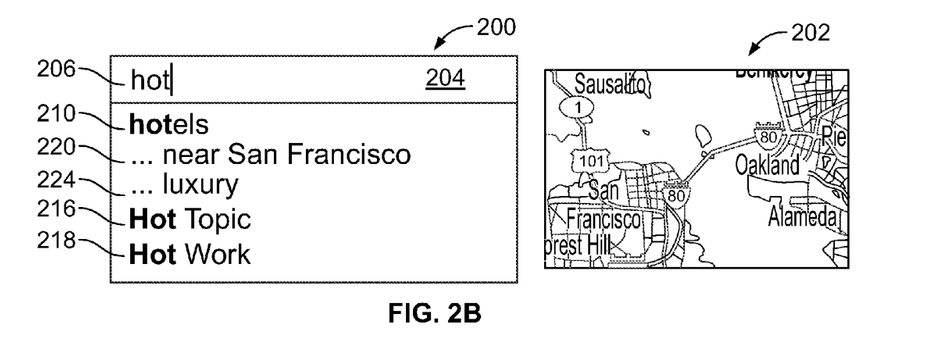
Figure 2C:
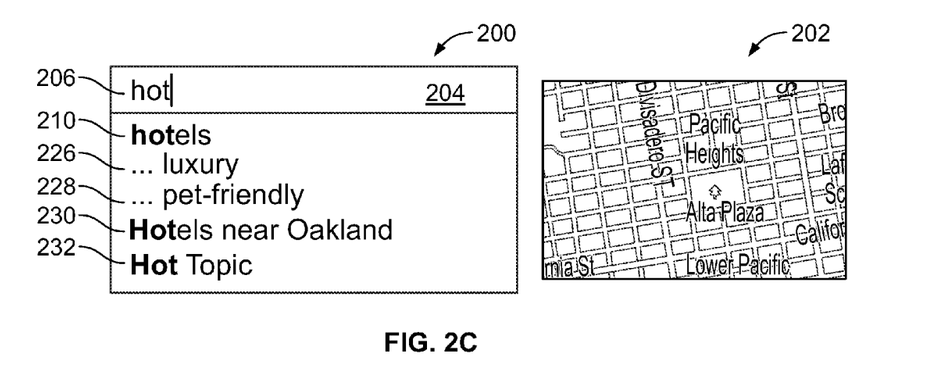

In some implementations, the search engine query input field is associated with a viewport displaying a portion of a graphical representation of a map at a zoom level. For example, referring again to FIGS. 2A-C, the query input field 204 is associated with the viewport 202 that is displaying a portion of a graphical representation of a map. The map shown in FIG. 2B is zoomed in relative to the map shown in FIG. 2A. The map shown in FIG. 2C is even further zoomed in relative to the map shown in FIG. 2B. That is, the map shown in FIG. 2A includes the cities of San Francisco, Oakland, San Bruno, San Mateo, Redwood City, Palo Alto, Sunnyvale, Hayward, San Leandro and Fremont. The map shown in FIG. 2B is at a different zoom level and shows a more detailed view of a smaller portion of the map, i.e., shows only San Francisco and Oakland, although in more detail than in FIG. 2A. The query suggestions that are received from the query suggestion engine 124 can be selected, at least in part, on what is being displayed in the viewport as the user is inputting a query. As such, the query suggestions that are generated when the viewport is showing the map in FIG. 2A will be different than the query suggestions that are generated when the viewport is showing the map in FIG. 2B or 2C, because these are different geographical regions on account of the different zoom levels as between the three maps. Because the query suggestions that are generated are different based on the zoom level of the map, the one or more refinement terms that refine the common primary query term also can be different. That is, the one or more refinement terms can be selected based, at least in part, on the zoom level of the map as presented in the viewport while the text input is being received.

Referring to FIG. 2B, the grouped query suggestions are different than those shown in FIG. 2A. Because the geographical region of San Francisco is featured more prominently in the viewport in FIG. 2B, the query suggestions that are generated include: (1) hotels; (2) hotels near San Francisco; and (3) hotels luxury, and no longer include "hotels near Oakland". Referring to FIG. 2C, the grouped query suggestions are again different than those shown in FIG. 2A or 2B. In FIG. 2C, the viewport is showing a zoomed in view of a particular area of San Francisco. As such, the query suggestion of "hotels near San Francisco" has dropped off the list because the search engine automatically searches for mapping results that are within the geographical region displayed, and since the entire region displayed is within San Francisco, using San Francisco as a refinement term would be redundant (just as using "United States" for query suggestions in FIG. 2A would be redundant). In this example however, the query suggestion "Hotels near Oakland" is shown in the list, but is no longer included in the grouped query suggestions. That is, if the user selected either hotels 210, hotels luxury 226 or hotels pet-friendly 228, the search results would automatically favor in the ranking hotels that are within the geographical region displayed in the viewport, that is, a refinement term relating to the geographical region (i.e., San Francisco) is implied. However, if the user in fact wanted to search for hotels near Oakland, then the user has the choice of selecting the query suggestion 'hotels near Oakland" 230, and search results that are responsive to that query will be generated and presented, in spite of what is currently shown in the viewport.

In such an implementation, the query grouping engine 125, when analyzing the query suggestions that are received from the query suggestion engine 124, can exclude query suggestions from a grouping if a query suggestion includes an explicit geographical location that is not currently being shown in the map displayed in the viewport. That is, in the example of FIG. 2C, consider that the query suggestion engine 124 generated the following query suggestions:
1. Hotels
2. Hotels luxury
3. Hotels pet-friendly
4. Hotels near Oakland
5. Hot Topic When determining the query suggestion groupings, if a query suggestion meets criteria to include in a group based on a common primary query term, e.g., hotels, but includes an explicit geographical location that is not currently being displayed in the viewport, then the query suggestion is not included in the grouping. That is, in this example, although the $4^{th}$ query suggestion in the list, "hotels near Oakland" shares a common primary query term with the first three query suggestions, the $4^{th}$ query suggestion includes an explicit geographical location, i.e., Oakland, that is not shown in the viewport. Accordingly, the $4^{th}$ query suggestion is not included in the grouping that includes the first three query suggestions in the above list.

In some implementations, if the zoom level is zoomed out to display a geographical region that includes multiple cities, then the refinement terms are selected, at least in part, to geographically refine the common primary query term. For example, referring to FIG. 2A, the zoom level is zoomed out to display a geographical region that includes multiple cities: San Francisco, Oakland, San Bruno, etc. In this example, the query grouping engine 125 is configured to include query suggestions in a group that each include an explicit geographical location. Other query suggestions that were generated by the query suggestion engine 124 can be ignored, such that the group of query suggestions includes refinement terms that geographically refine the common primary query term. For example, consider that the query suggestion engine 124 generated the following query suggestions:
1. Hotels
2. Hotels luxury
3. Hotels pet-friendly
4. Hotels near Oakland
5. Hotels near San Francisco
6. Hot Topic
7. Hotmail, Mountain View, Calif.

The query grouping engine 125 can determine that query suggestions (1) through (5) include a common primary query term, i.e., hotels. However, the query grouping engine 125 can further determine that the zoom level is zoomed out to display more than a predetermined threshold number of geographical locations (e.g., cities), and therefore select the query suggestions for the grouping based on a further criteria that the query suggestions include a refinement term that geographically refines the common primary query term. As such, the $2^{nd}$ and $3^{rd}$ query suggestions in the above list are not included in the grouping and in this particular example are ignored, i.e., not presented, to the user in the list of query suggestions. In other implementations, the $2^{nd}$ and $3^{rd}$ queries may be presented, but just not included in a grouping with the $4^{th}$ and $5^{th}$ query suggestions.

In some implementations, when the zoom level is zoomed in to display a geographical region that includes a geographical region approximately centered about a particular city, the refinement terms are selected to geographically and qualitatively refine the common primary query term. That is, referring to FIG. 2B, the viewport shows a geographical region that is approximately centered above the city of San Francisco. As such, the query grouping engine 125 can be configured to group query suggestions based on both geographical and qualitative refinement terms. In the particular example shown, the query suggestions that are included in the group are "hotels near San Francisco" (i.e., a query suggestion including refinement terms that geographically refine the common primary query term of "hotels") and "hotels luxury" (i.e., a query suggestion including refinement terms that qualitatively refine the common primary query terms of "hotels").

In some implementations, when the zoom level is zoomed in to display a geographical region that is approximately centered about a particular location within a city, the refinement terms are selected to qualitatively refine the common primary query term. That is, referring to FIG. 2C, the viewport shows a particular location within the city of San Francisco. As such, the query grouping engine 125 can be configured to group query suggestions that qualitatively refine the common primary query term. As was discussed above, a query suggestion that includes an explicit search term that is geographical location that is not shown in the viewport can be excluded from the group of query suggestions that are grouped to only qualitatively (and not geographically) refine the common primary query term. Accordingly, in this example, the group of query suggestions includes "hotels luxury" and "hotels pet-friendly", but excludes "hotels near Oakland" since the city of Oakland is not shown in the viewport.

Figure 3A:
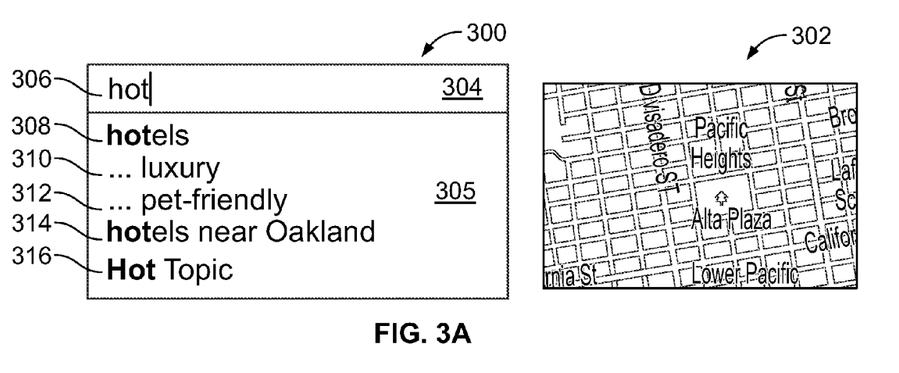
Figure 3B:
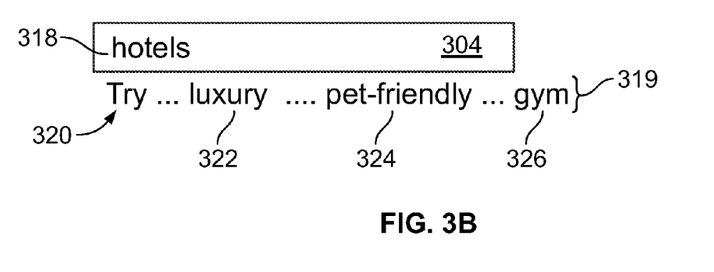
FIGS. 3B-3D, 4A and 4B are schematic representations of example query input fields and presentations of query refinement suggestions.
Figure 3C:
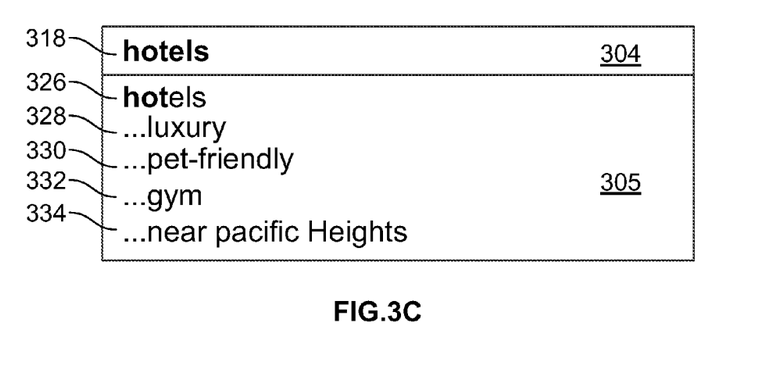
Figure 3D:
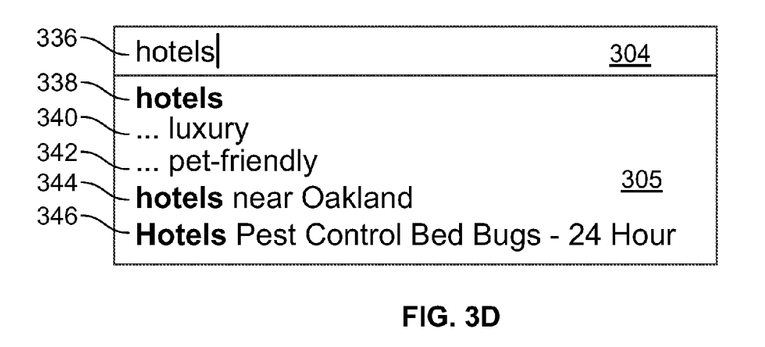

After receiving an input from the user that selects a query suggestion and that submits that as a search query to the search engine, a set of search results are obtained from the search engine 121, i.e., using conventional techniques, that are responsive to the search query. The set of search results are transmitted to the user's device for presentation to the user. In some implementations, when the user selects the common primary query term as the search query and the search results are presented to the user, the refinement terms (or at least some) that were included in the grouped query suggestions are simultaneously presented to the user as user-selectable refinement terms that are selectable to refine the submitted search query. FIGS. 3B-3D are schematic representations of example query input fields and presentations of query refinement suggestions. FIG. 3A illustrates a user inputting the characters "hot" into a search query field 304 and at the same time being presented with a list of query suggestions 305 that include a group of query suggestions. The group of query suggestions share a common primary query term "hotels" and include the refinement terms "luxury" 310 and "pet-friendly"

312. In this example, the user selects the common primary query terms "hotels" 308 and submits this as the search query to the search engine.

FIG. 3B shows the query input field 304 at a later time, i.e., after the search query has been submitted and the search results presented (not shown). Beneath the query input field 304 the list of query suggestions 305 is no longer shown, but is replaced by a line of text 319. The line of text 319 has the advantage of presenting the text to the user without obscuring the search results. The text 319 suggests to the user that they try certain refinement terms if they desire to further refine their search results. The refinement terms presented are a subset of all the possible refinement terms for the current query "hotels". The refinement terms shown in the example are "luxury" 322, "pet-friendly" 324 and "gym" 326. That is, the refinement terms include the refinement terms that were previously presented in the group of query suggestions shown in FIG. 3A and an additional refinement term, i.e., gym. The refinement terms to include in the text 319, which are presented at the same time as the search results for the search query "hotels", are selected, at least in part, from the query suggestions that were included in the group having "hotels" as the common primary query term. In some implementations, the line of text 319 is displayed after search query has been submitted and the user has removed focus from the query input field 304, for example by selecting a search result.

FIG. 3C shows the query input field presented to the user in response to the user selecting the query input field after the search query has been submitted and the search results presented. Selecting the query input field can include any action that causes the user interface to focus on the query input field. The refinement terms 305 are presented to the user in a drop down box. The drop down box only include refinement terms that refine the search query presently displayed in the search query field 304.

FIG. 3D illustrates what can be presented after the user enters new characters into, or modifies characters within the search query field 304. That is, FIGS. 3B and 3C show what can be presented to the user at the same time as their search results without further user input. If the user then enters new characters into, or modifies characters within the search query field 304, then a new set of query suggestions 305 are presented to the user. The query suggestions include a mix of refinement terms that refine the search query presently displayed in the search query field 304 and other query suggestions, e.g., "hotels near Oakland" 344, etc. The difference between what is presented in FIG. 3A and FIG. 3D is that in FIG. 3A the user had only partially input a search query and had not yet submitted a search query. However, in FIG. 3D, the user has already selected a query suggestion and submitted it as a search query, therefore providing additional information about what type of search results would be responsive to the user. With that information available, query suggestions such as "Hot Topic" are no longer presented, since it is now known that the user was most likely typing the word "hotels" when inputting the characters "hot" and not the word "hot".

Figure 4A:
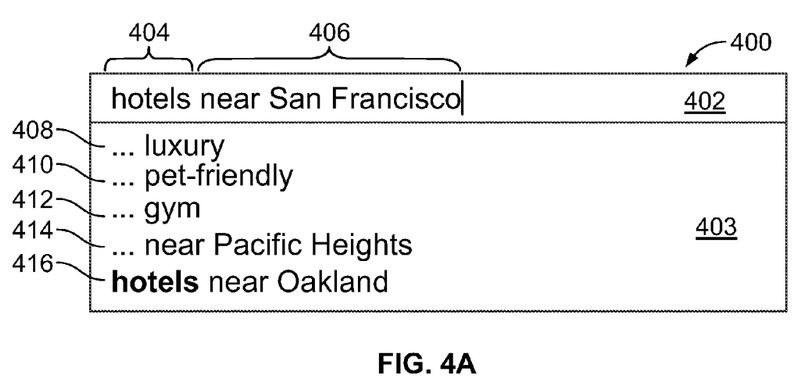
Figure 4B:
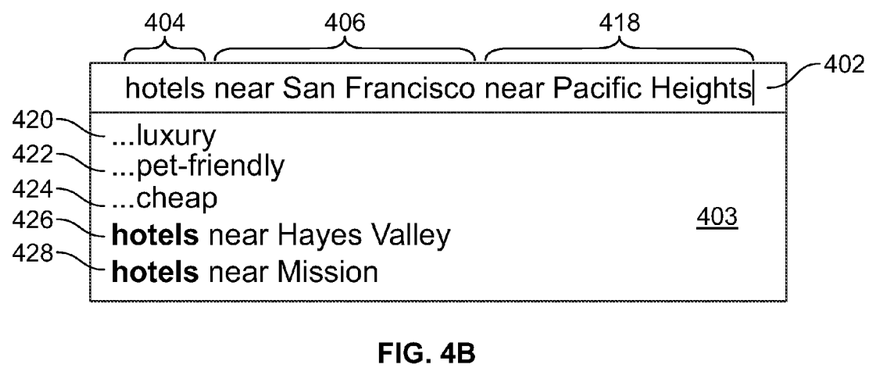

FIGS. 4A-B are schematic representations of example query input fields and presentations of query refinement suggestions. FIG. 4A shows an example of receiving an input from the user selecting one of the query suggestions That is, referring to FIG. 2B, the received text input from the user is "hot" 206 and the query suggestions include "hotels near San Francisco" 220. FIG. 4A shows the user interface after the user has selected "hotels near San Francisco" 220, and the resulting search query is displayed in the query input field 402, i.e., "hotels near San Francisco". Before the user has submitted the search query, a second set of query suggestions are obtained and presented based on the search query in the query input field 402. At least some of the query suggestions are grouped together and are refinement terms that refine the search query in the query input field 402. The grouped refinement terms are presented in a position relative to the search query in the query input field 402 that indicates that the group includes refinement terms to further refine the search query. For example, as shown, the grouped refinement terms are presented at the top of the list directly beneath the query input field and each refinement term is preceded by an ellipsis. The user is thereby given an indication that the terms "near Pacific Heights" 414 are intended to further refine the search query "hotels near San Francisco".

FIG. 4B shows the user interface after the user has selected the refinement terms "near Pacific Heights" 414. The revised search query, i.e., "hotels near San Francisco near Pacific Heights" is shown in the query input field 402. In effect, the refinement terms are "stacked" and the user can continue to be presented with new suggestions on refinement terms and continue to make selections to further revise and grow their search query before selecting to submit the search query to the search engine. The user can further edit the search query by typing and deleting characters within the query input field, e.g., to change "near San Francisco" to "in San Francisco".

Figure 5:
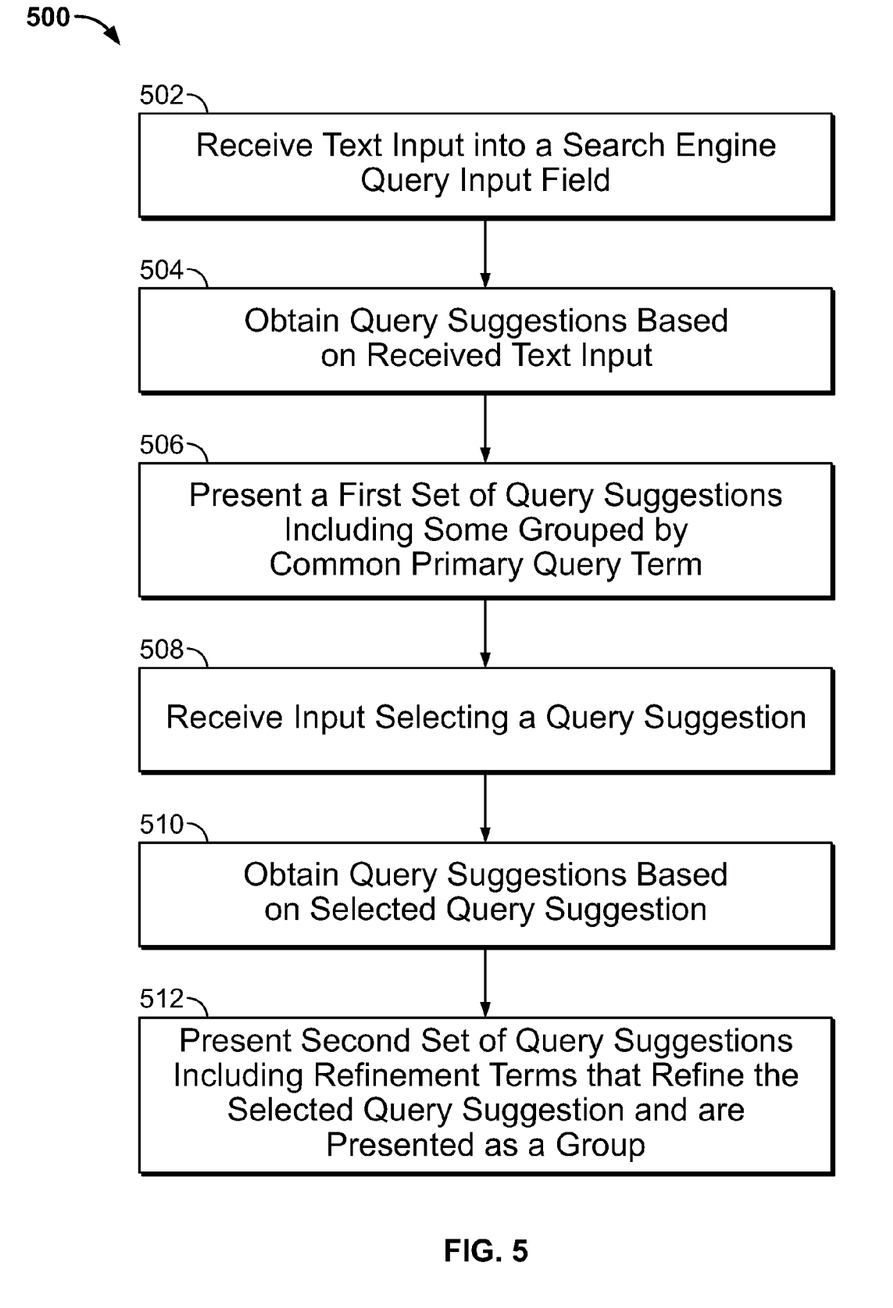
FIG. 5 is a flowchart showing an example process for presenting query refinements.

FIG. 5 is a flowchart showing an example process for presenting query refinements. A text input is received into a query input field for a search engine (Step 502). The text input can be typed by a user or spoken by a user and converted to text or otherwise input. A first set of query suggestions are obtained based on the received text input (Step 504). For example, referring again to FIG. 2A, the received text input is "hot" 206. A set of query suggestions are obtained based, at least in part, on the characters "hot" input by the user. As previously discussed, in some implementations, e.g., in a mapping application, the query suggestions can be obtained based on other information, such as the geographical region displayed in a viewport that is displayed together with the query input field.

The first set of query suggestions is presented to the user including at least one group of query suggestions that shares a common primary query term (Step 506). That is, the query suggestions that are generated, for example, using conventional techniques, are analyzed to identify query suggestions that share a common primary query term and those query suggestions can together form a group of query suggestions. The group is presented to the user in a manner that identifies the common primary query term and identifies the refinement terms, i.e., terms that refine the common primary query term and that form the balance of each of the query suggestions included in the group. Referring again to FIG. 2A, the query suggestions presented to the user include one group of query suggestions that share the common primary query term "hotels" 210 and that include the refinement terms "near Oakland" 212 and "near San Francisco" 214.

A user input is received selecting a query suggestion from the presented query suggestions (Step 508). For example, referring again to FIG. 4A, the user selected "hotels near San Francisco", which is then displayed in the query input field 402. A second set of query suggestions are obtained based on the selected query suggestion (Step 510). The second set of query suggestions include refinement terms that refine the selected query suggestion and are presented to the user as a group (Step 512). For example, referring to FIG. 4A, the second set of query suggestions includes the refinement terms "luxury" 408, pet-friendly 410, "gym" 412 and "near Pacific Heights" 414 that further refine the search query "hotels near San Francisco" that is shown in the query input field 402. The refinement terms are grouped together and presented in a manner that indicates to the user that they refine the search query presently displayed in the query input field 402. The user can select to submit the query at that point or to further refine or otherwise edit the search query. For example, as shown in FIG. 4B, the user has chosen to further refine the search query with the refinement terms "near Pacific Heights" 418.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
while receiving a text input entered into a search engine query input field by a user, the query input field displayed in a map user interface having a viewport displaying a portion of a map at a particular zoom level, and before the user has submitted the text input as a search query to a search engine:
determining the particular zoom level and a geographical location associated with the portion of the map displayed in the viewport at the particular zoom level;
obtaining a plurality of query suggestions based at least in part on the received text input;
grouping at least some of the query suggestions based on a common primary query term shared by the query suggestions, wherein the grouped query suggestions include one or more refinement terms that refine the common primary query term, wherein the one or more refinement terms that refine the common primary query term are selected based, at least in part, on the particular zoom level of the map as presented in the viewport while the text input is being received, and the geographical location displayed in the viewport while the text input is being received; and
transmitting a set of the plurality of query suggestions to a client device for presentation to the user, wherein the set includes the grouped query suggestions that are presented as a group with the common primary query term presented in a prominent position and the one or more refinement terms presented in subordinate positions relative to the common primary query term and wherein the common primary query term and the one or more refinement terms are each user-selectable.

2. The computer-implemented method of claim 1, wherein the received text input does not comprise a complete word and the common primary query term comprises a suggested word completion of the received text input.

3. The computer-implemented method of claim 1, wherein the particular zoom level is zoomed out to display a geographical region that includes a plurality of cities and the one or more refinement terms are selected, at least in part, to geographically refine the common primary query term.

4. The computer-implemented method of claim 1, wherein the particular zoom level is zoomed in to display a geographical region that includes a geographical region approximately centered about a particular city and the one or more refinement terms are selected, at least in part, to geographically and qualitatively refine the common primary query term.

5. The computer-implemented method of claim 1, wherein the particular zoom level is zoomed in to display a geographical region that is approximately centered about a particular location within a city and the one or more refinement terms are selected, at least in part, to qualitatively refine the common primary query term.

6. The computer-implemented method of claim 1, further comprising:
receiving an input from the user selecting one of the query suggestions, wherein the received text input and the selected query suggestion comprise a search query;
before the user has submitted the search query:
obtaining a second plurality of query suggestions based on the search query, wherein at least some of the query suggestions comprise refinement terms that refine the search query and are grouped together; and
transmitting a set of the second plurality of query suggestions to the client device for presentation to the user, wherein the set includes the grouped query suggestions that are presented in a position relative to the search query that indicates the grouped query suggestions are refinement terms that refine the search query.

7. The computer-implemented method of claim 1, further comprising:
receiving an input from the user that selects the common primary query term and that submits a search query comprising the common primary query term to the search engine;
obtaining a set of search results that are responsive to the search query; and
transmitting the set of search results to the client device for presentation to the user, wherein the at least some of the refinement terms included in the grouped query suggestions are simultaneously presented to the user as user-selectable refinement terms that are selectable to refine the submitted search query.

8. A computer-implemented system comprising:
one or more computers;
one or more data storage devices coupled to the one or more computers and storing instructions that, when executed by the one or more computers, cause the one or more computers to perform operations comprising:
while receiving a text input entered into a search engine query input field by a user, the query input field displayed in a map user interface having a viewport displaying a portion of a map at a particular zoom level, and before the user has submitted the text input as a search query to a search engine:
determining the particular zoom level and a geographical location associated with the portion of the map displayed in the viewport at the particular zoom level;
obtaining a plurality of query suggestions based at least in part on the received text input;
grouping at least some of the query suggestions based on a common primary query term shared by the query suggestions, wherein the grouped query suggestions include one or more refinement terms that refine the common primary query term, wherein the one or more refinement terms that refine the common primary query term are selected based, at least in part, on the particular zoom level of the map as presented in the viewport while the text input is being received, and the geographical location displayed in the viewport while the text input is being received; and
transmitting a set of the plurality of query suggestions to a client device for presentation to the user, wherein the set includes the grouped query suggestions that are presented as a group with the common primary query term presented in a prominent position and the one or more refinement terms presented in subordinate positions relative to the common primary query term and wherein the common primary query term and the one or more refinement terms are each user-selectable.

9. The computer-implemented system of claim 8, wherein the received text input does not comprise a complete word and the common primary query term comprises a suggested word completion of the received text input.

10. The computer-implemented system of claim 8, wherein the particular zoom level is zoomed out to display a geographical region that includes a plurality of cities and the one or more refinement terms are selected, at least in part, to geographically refine the common primary query term.

11. The computer-implemented system of claim 8, wherein the particular zoom level is zoomed in to display a geographical region that includes a geographical region approximately centered about a particular city and the one or more refinement terms are selected, at least in part, to geographically and qualitatively refine the common primary query term.

12. The computer-implemented system of claim 8, wherein the particular zoom level is zoomed in to display a geographical region that is approximately centered about a particular location within a city and the one or more refinement terms are selected, at least in part, to qualitatively refine the common primary query term.

13. The computer-implemented system of claim 8, wherein the instructions, when executed by the one or more computers, cause the one or more computers to perform operations further comprising:
receiving an input from the user selecting one of the query suggestions, wherein the received text input and the selected query suggestion comprise a search query;
before the user has submitted the search query:
obtaining a second plurality of query suggestions based on the search query, wherein at least some of the query suggestions comprise refinement terms that refine the search query and are grouped together; and
transmitting a set of the second plurality of query suggestions to the client device for presentation to the user, wherein the set includes the grouped query suggestions that are presented in a position relative to the search query that indicates the grouped query suggestions are refinement terms that refine the search query.

14. The computer-implemented system of claim 8, wherein the instructions, when executed by the one or more computers, cause the one or more computers to perform operations further comprising:
  receiving an input from the user that selects the common primary query term and that submits a search query comprising the common primary query term to the search engine;
  obtaining a set of search results that are responsive to the search query; and
  transmitting the set of search results to the client device for presentation to the user, wherein the at least some of the refinement terms included in the grouped query suggestions are simultaneously presented to the user as user-selectable refinement terms that are selectable to refine the submitted search query.

15. A computer-readable storage device encoded with instructions which, when executed by one or more computers, cause the one or more computers to perform operations comprising:
  while receiving a text input entered into a search engine query input field by a user, the query input field displayed in a map user interface having a viewport displaying a portion of a map at a particular zoom level, and before the user has submitted the text input as a search query to a search engine:
    determining the particular zoom level and a geographical location associated with the portion of the map displayed in the viewport at the particular zoom level;
    obtaining a plurality of query suggestions based at least in part on the received text input;
    grouping at least some of the query suggestions based on a common primary query term shared by the query suggestions, wherein the grouped query suggestions include one or more refinement terms that refine the common primary query term, wherein the one or more refinement terms that refine the common primary query term are selected based, at least in part, on the particular zoom level of the map as presented in the viewport while the text input is being received, and the geographical location displayed in the viewport while the text input is being received; and
    transmitting a set of the plurality of query suggestions to a client device for presentation to the user, wherein the set includes the grouped query suggestions that are presented as a group with the common primary query term presented in a prominent position and the one or more refinement terms presented in subordinate positions relative to the common primary query term and wherein the common primary query term and the one or more refinement terms are each user-selectable.

16. The computer-readable storage device of claim 15, wherein the received text input does not comprise a complete word and the common primary query term comprises a suggested word completion of the received text input.

17. The computer-readable storage device of claim 15, wherein the particular zoom level is zoomed out to display a geographical region that includes a plurality of cities and the one or more refinement terms are selected, at least in part, to geographically refine the common primary query term.

18. The computer-readable storage device of claim 15, wherein the particular zoom level is zoomed in to display a geographical region that includes a geographical region approximately centered about a particular city and the one or more refinement terms are selected, at least in part, to geographically and qualitatively refine the common primary query term.

19. The computer-readable storage device of claim 15, wherein the particular zoom level is zoomed in to display a geographical region that is approximately centered about a particular location within a city and the one or more refinement terms are selected, at least in part, to qualitatively refine the common primary query term.

20. The computer-readable storage device of claim 15, wherein the instructions, when executed by the one or more computers, cause the one or more computers to perform operations further comprising:
  receiving an input from the user selecting one of the query suggestions, wherein the received text input and the selected query suggestion comprise a search query;
  before the user has submitted the search query:
    obtaining a second plurality of query suggestions based on the search query, wherein at least some of the query suggestions comprise refinement terms that refine the search query and are grouped together; and
    transmitting a set of the second plurality of query suggestions to the client device for presentation to the user, wherein the set includes the grouped query suggestions that are presented in a position relative to the search query that indicates the grouped query suggestions are refinement terms that refine the search query.

21. The computer-readable storage device of claim 15, wherein the instructions, when executed by the one or more computers, cause the one or more computers to perform operations further comprising:
  receiving an input from the user that selects the common primary query term and that submits a search query comprising the common primary query term to the search engine;
  obtaining a set of search results that are responsive to the search query; and
  transmitting the set of search results to the client device for presentation to the user, wherein the at least some of the refinement terms included in the grouped query suggestions are simultaneously presented to the user as user-selectable refinement terms that are selectable to refine the submitted search query.

* * * * *